Patented Feb. 11, 1941

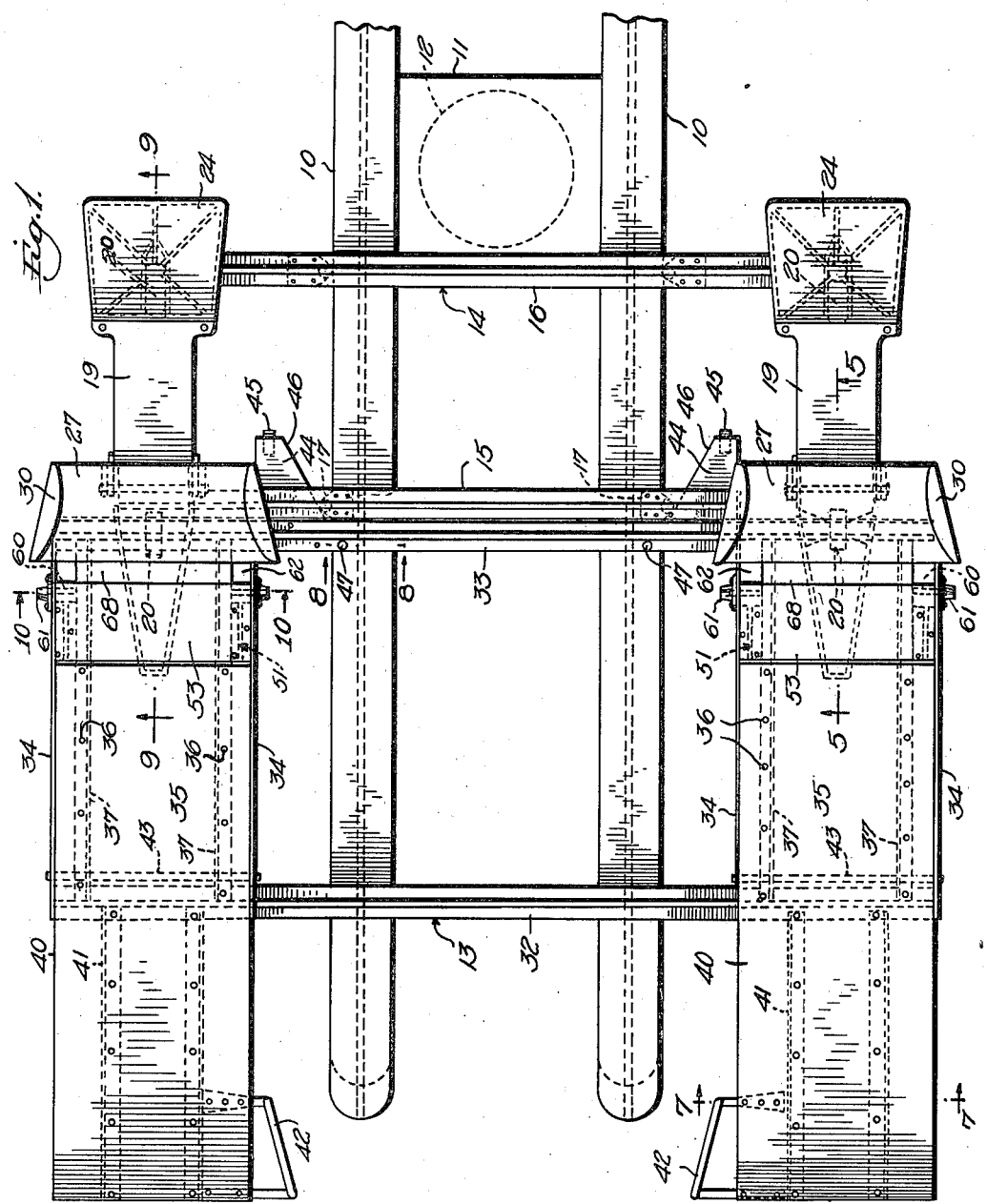

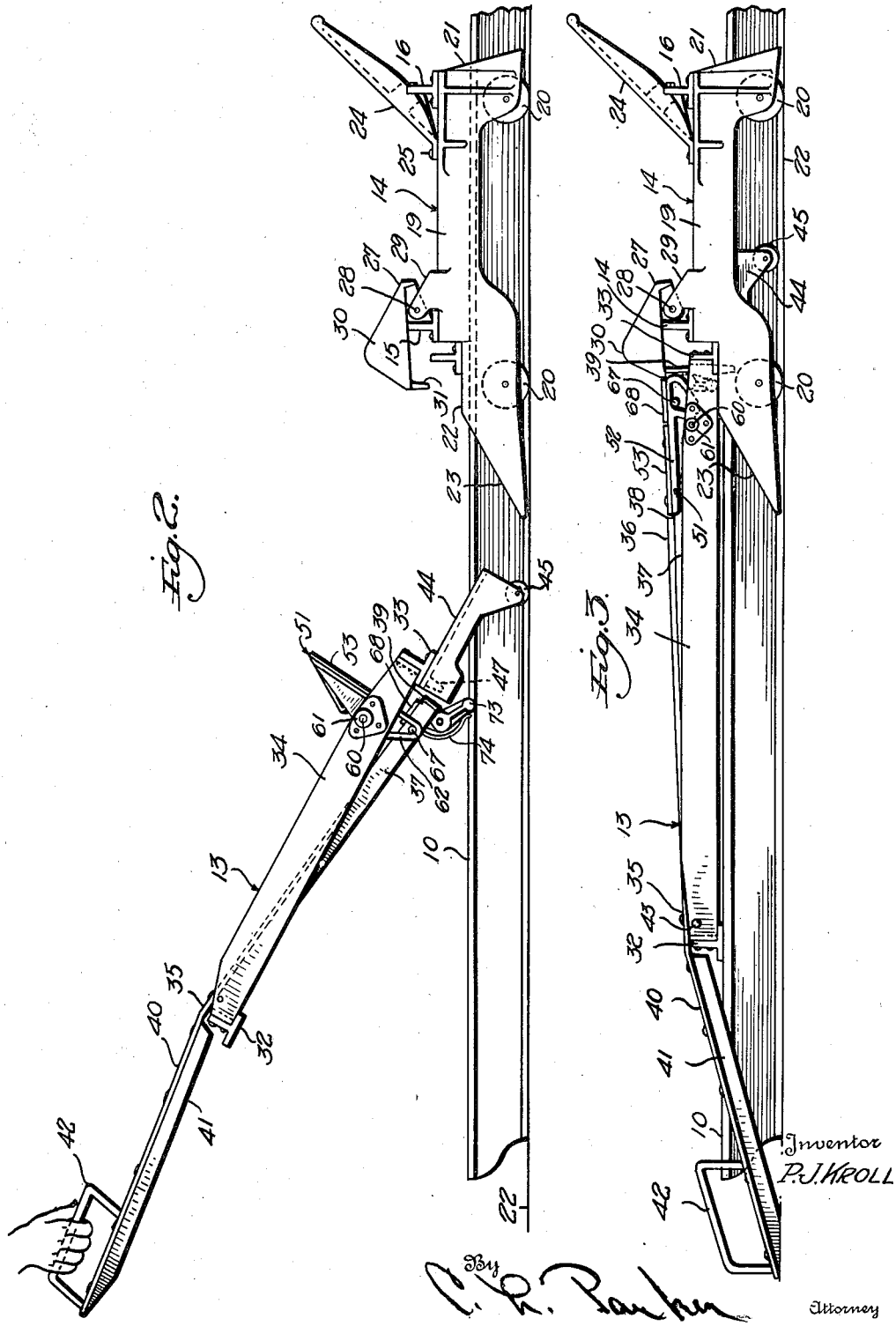

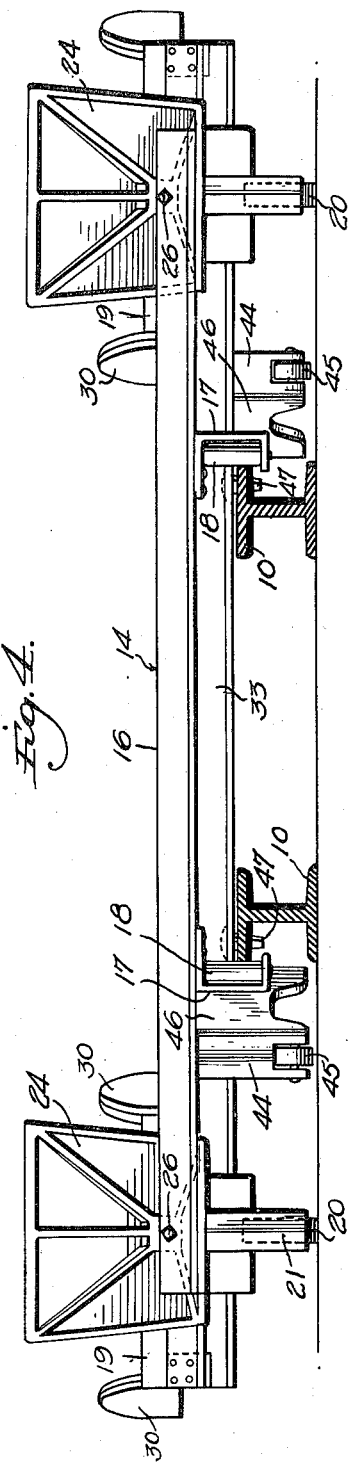
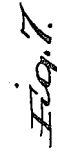
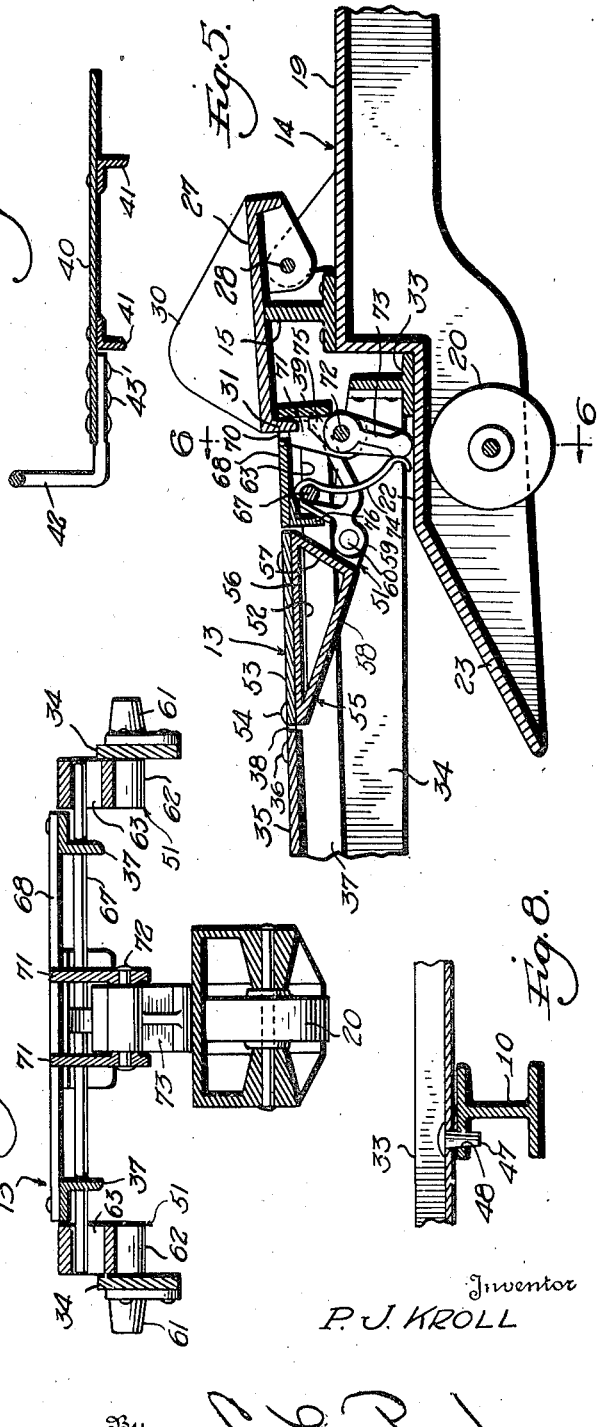

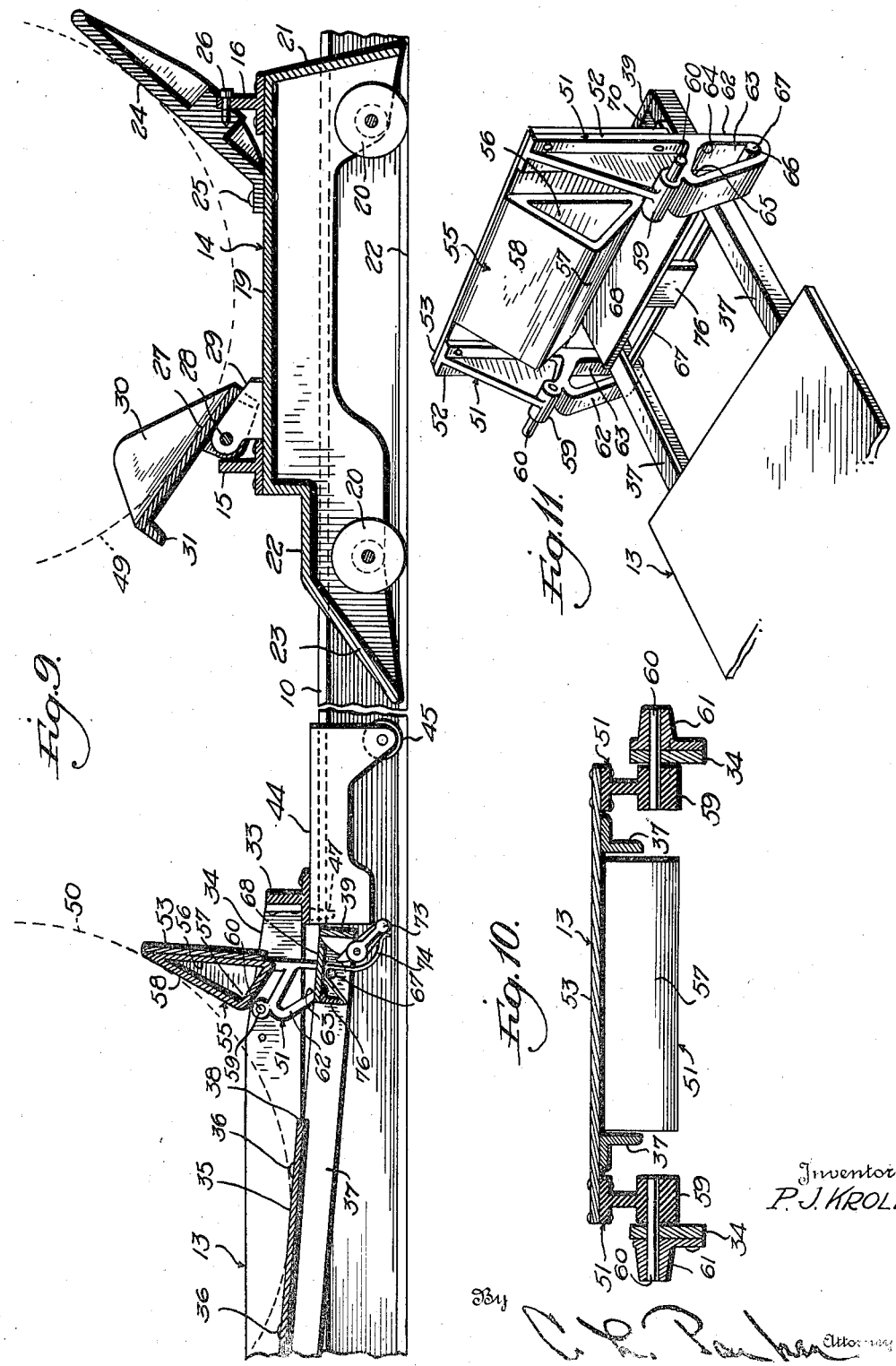

2,231,362

UNITED STATES PATENT OFFICE 2,231,362

VEHICLE LIFT

Philip J. Kroll, New Orleans, La., assignor to Marjorie Kroll, Cambridge, Mass.

Application May 9, 1940, Serial No. 334,243

24 Claims. (Cl. 254—89)

This invention relates to vehicle lifts, and more particularly to an apparatus for converting a vehicle lift of the "free-wheel" type into a lift of the "run-on" type, and is an improvement over the structure shown in my prior Patent No. 2,199,524, granted May 7, 1940.

As is well known, there are two types of vehicle lifts, namely, the "free-wheel" type wherein the vehicle is lifted beneath the chassis to leave the wheels free for rotation, and the "run-on" type having a pair of parallel wheel runways over which the vehicle is driven and through which it is lifted.

Both types of lifting mechanisms are desirable for different kinds of work, and in many cases the "run-on" type is more desirable than the "free-wheel" type. It is highly desirable in order to secure the advantages of both types of lifts to provide some means whereby a "free-wheel" lift may be converted into a "run-on" lift, and such an apparatus forms the subject matter of my prior patent referred to above. In such prior patent I have provided two mechanisms adapted to be arranged on a free-wheel lift in adjacent relationship and provided with normally inoperative chock means. Each of the two mechanisms is provided with wheel-supporting trackways whereby the vehicle may be driven into position thereon. The apparatus is provided with means whereby a vehicle may be driven onto one mechanism and across onto the other mechanism, which supports the front wheels of the vehicle and is movable away from the other mechanism as the vehicle is driven into position, until the rear wheels of the vehicle are supported on the latter mechanism. The means which provides movement of the front wheels of the vehicle from one mechanism to the other locks the two mechanisms together until the front wheels of the vehicle are in proper position, whereupon the two mechanisms are disconnected from each other to permit the mechanism supporting the front wheels to move away from the mechanism which supports the rear wheels.

Each mechanism is provided with means operative when the vehicle wheels are in position thereon to chock the wheels and thus hold the veicle against rolling movement. With a vehicle in the position referred to, the lift may be operated to elevate the vehicle to permit the desired work to be performed thereon, whereupon the lift is again lowered into contact with the ground. The vehicle is then backed off from the apparatus under its own power and as the rear wheels leave the mechanism which supports them, the front wheels will pull their supporting mechanism rearwardly back into a position adjacent the rear wheel supporting mechanism, whereupon the two mechanisms will be automatically locked together to permit the front wheels to be backed over the rear wheel supporting mechanism and thus off from the apparatus.

An important object of the present invention is to improve the mechanism referred to, particularly as to the means for locking the wheel supporting mechanisms in adjacent relation.

A further object is to provide a stationary front wheel chock and a pivoted front wheel chock, wherein the latter chock is normally arranged in a horizontal position to provide a trackway over which the front wheels move into position on their supporting mechanism, the pivoted chock being automatically movable into chocking position as the front wheels reach their proper position on their supporting mechanism and to provide means wholly independent of the front wheel chocking means for performing the same function with relation to the rear wheels of the vehicle.

A further object is to provide chock means for the rear wheels of the vehicle comprising devices adapted to be arranged forwardly and rearwardly of the rear wheels and associated with means whereby they are simultaneously operable to assume operative and inoperative positions.

A further object is to provide novel means controlled in accordance with the relative positions of the front wheel and rear wheel mechanisms for determining the operativeness or inoperativeness of the means which controls the rear wheel chocking devices.

A further object is to provide a mechanism of the character just referred to wherein the means operative in accordance with the relative positions of the wheel supporting mechanisms is operative when such mechanisms are in adjacent relationship for locking the rear wheel chocking devices in such positions as to provide runways over which the front vehicle wheels may travel toward the front wheel supporting mechanism.

A further object is to provide a novel type of rear wheel supporting mechanism in an apparatus of this character wherein such mechanism is easily portable and is movable into operative position by being rolled much after the manner of a wheelbarrow.

A further object is to provide a mechanism of this character having means adapted to be readily interengaged between the lift frame members and the rear wheel supporting mechanism when the latter is rolled into position, to positively fix such mechanism against movement when in operation.

Other objects and advantages of the invention will become apparent during the course of the following description.

In the drawings I have shown one embodiment of the invention. In this showing—

Figure 1 is a plan view of the apparatus,

Figure 2 is a side elevation of the apparatus showing one of the platform structures in operative position and the other being moved to operative position, Figure 3 is a similar view showing the structure in completely assembled relation, Figure 4 is an end elevation of the structure of the apparatus, Figure 5 is an enlarged vertical fragmentary detail sectional view on line 5—5 of Figure 1, Figure 6 is a similar view on line 6—6 of Figure 5, Figure 7 is a detail sectional view on line 7—7 of Figure 1, Figure 8 is a fragmentary sectional view on line 8—8 of Figure 1, Figure 9 is an enlarged fragmentary sectional view on line 9—9 of Figure 1, showing the parts in operative or vehicle-chocking positions, Figure 10 is a transverse vertical sectional view on line 10—10 of Figure 1, and, Figure 11 is a detail fragmentary perspective view of a portion of the mechanism showing one of the automatically operative rear wheel vehicle-chocking devices in operative position.

Referring to the drawings the numeral 10 designates a pair of rails forming a part of a conventional free-wheel lift, these rails being arranged parallel to each other and at such a distance apart as to be arranged within the vehicle wheels to engage beneath the chassis of a vehicle. The rails 10 are preferably of I-beam section as shown in Figure 4. These rails are suitably secured in any desired manner to a plate 11 supported by any conventional vehicle lifting means 12 such as the hydraulic plunger of a conventional lift.

The apparatus forming the subject matter of the present invention is in the form of an attachable mechanism for converting the free-wheel lift into a run-on lift, thus permitting a purchaser to employ a single lifting apparatus as a whole either as a free-wheel lift or as a run-on lift. The invention comprises a pair of platform structures indicated as a whole by the respective numerals 13 and 14. It will become apparent that the structure 13 is fixed against movement longitudinally of the rails 10 and the front wheels of the vehicle are adapted to be driven over portions of the structure 13 to be described and to assume positions on the structure 14, whereupon the latter structure is movable away from the structure 13 to permit the rear wheels of the vehicle to be moved into position on the latter structure. The platform structure 14 comprises a pair of parallel beams 15 and 16 arranged transversely of the rails 10 and spaced somewhat thereabove as shown in Figure 4. As stated, the structure 14 is the movable platform structure and to facilitate its being placed in position with respect to the rails 10, each beam 15 and 16 is provided with a bearing bracket 17 carrying a roller 18 engageable against the outer edges of the rails 10.

In this connection attention is invited to the fact that various types of free-wheel lifts of different manufacture vary slightly as to their over-all width, that is, the width between the remote edges of the rails 10. However, such variation is not great and it is confined within limits sufficiently small to permit the rollers 18 to be mounted in fixed positions with respect to the beams 15 and 16. In Figure 4 it may be assumed that the free-wheel lift is of the type having the greatest over-all width, whereby the rollers 18 are engageable with the outer edges of both of the rails 10. In narrower lifts, there will be some space between the rollers 18 and the rails 10, but this space will not be sufficient to permit the structure 14 to be arranged any substantial distance off center to materially unbalance the load of the vehicle on the lift.

As shown in Figures 2 and 9, the ends of the rails 15 and 16 rest upon the tops of a pair of cast bodies 19 of preferably inverted channeled section. Each of the bodies 19 is supported by rollers 20 whereby the platform structure 14 as a whole is adapted to be rolled when the front wheels of a vehicle are on the bodies 19, as will become apparent. One end of each body 19 is formed as a wall 21 which slopes downwardly at a relatively sharp angle to a point in proximity to the surrounding surface 22 upon which the rollers rest. The wall 21 of each of the bodies 19 not only protects the adjacent roller 20, but also serves to push out of the way any tools, cans or other articles which may be in the path of movement of the bodies 19. The top wall of each body 19 is offset downwardly as at 22 adjacent the end opposite the wall 21, and such wall is formed integral with a downwardly and inwardly sloped end wall 23 which serves the same purpose as the corresponding wall 21, and also serves an additional function as a cam surface, in a manner to be described.

Each of the movable bodies 19 is provided with a preferably cast stationary chock element 24 secured at one end to the body 19 as at 25, and secured intermediate its ends as at 26 to the adjacent end of the beam 16. A pivoted chock member 27 is arranged adjacent the opposite end of each movable body 19, each chock 27 being pivotally connected as at 28 to ears 29 carried by the top of the adjacent body 19. Each of the pivoted chocks 27 is provided with side flanges 30 to act as guides for a vehicle tire passing over each movable chock. Each of these chock elements is also provided at one end with a depending lip 31 which forms means for locking the movable structure 14 to the stationary structure 13 in a manner to be described.

The stationary platform structure 13 likewise comprises a pair of parallel beams 32 and 33 arranged transversely of the rails 10 and spaced apart a distance substantially greater than the distance between the beams 15 and 16. The beams 32 and 33 are connected to the ends of the two pairs of spaced parallel frame members 34 which may be flat in cross-section (Figure 6) but which are preferably relatively heavy. Pairs of frame members 34 and elements associated therewith are identical, and accordingly only one need be described in detail. A ramp member 35 is arranged with one end portion between each pair of frame members 34 and the portion of each ramp member arranged between such rails is secured by rivets or any other suitable means 36 to a pair of angle iron bracing elements 37 arranged parallel to each other. The inner end of each ramp 35 terminates at the point 38, spaced a substantial distance from the adjacent beam 33, for a purpose to be described. However, the corresponding ends of the angle irons 37 extend almost to the beams 33 and are connected by cross members 39 (Figure 9).

The outer or rear ends of the ramp members 35 are sloped downwardly as at 40 with the extremities of such portions of the runways in close proximity to the surrounding surface to facilitate the driving of a vehicle over the runways. Such sloping portions of the runways are braced by parallel angle or similar structural elements 41. Adjacent their lower ends, the sloping ramp portions 40 are provided with handles 42 of preferably inverted U-shape with their ends turned beneath the adjacent portions of the runway and secured to the latter by rivets 43'. As shown in Figure 1, the handles 42 diverge from the entering ends of the runways. Accordingly the handles serve not only to assist in transporting the structure 13, but also act as guides for the tires of a vehicle entering the runways.

As stated, the sloping ends 40 of the runways have their lower ends normally arranged in proximity to the supporting surface, and after the rear wheels of a vehicle move onto the portions of the runways between the frame members 34, the runways are adapted to tilt downwardly at their inner ends to perform certain functions. For the purpose of pivotally supporting the runways, each pair of angle iron braces 37 is provided adjacent the beam 32 with a shaft 43 extending between the angle irons of the pair and through the adjacent frame members 34.

In order to render the structure 13 portable to enable it to be readily placed in operative position and removed therefrom, the beam 33 is riveted or otherwise secured within its ends to preferably cast bodies 44 each of which is provided with a roller 45. These rollers serve to support the structure 13 when the latter is being rolled into position (Figure 2) but are out of contact with the surrounding surface when the apparatus is assembled, as shown in Figures 3, 4 and 9. The structures 44 have sloping inner faces 46 (Figure 1) to engage the roller brackets 17 (Figure 4) as the apparatus is being rolled into position. In order to fix the structure 13 against movement when it is in operative position, the beam 33 is provided with a pair of pins 47 (Figure 1) each engageable in an opening 48 (Figure 8) formed in one of the rails 10.

The ramps 35 are associated with mechanism for accomplishing several purposes, namely, to support the inner end of the ramp 35 against downward movement while the forward wheels of the vehicle are passing thereover, and to chock the rear wheels of the vehicle when such wheels reach the proper point. In this connection, it will be noted that the forward and rear wheels of the vehicle have been shown in dotted lines in Figure 9 and have been indicated respectively by the numerals 49 and 50. Referring to Figures 5, 6, 9, 10 and 11, the numeral 51 designates a pair of operating members as a whole, each arranged just within one of the side frame members 34. These operating members are identical with each other and each comprises an arm 52, normally horizontally arranged and supporting a plate 53 secured thereto by rivets 54 or in any other suitable manner. This plate, when in the normal position shown in Figure 5, has one edge arranged in close proximity to the edge 38 of the ramp 35, the plate 53 thus normally forming a continuation of the ramp 35. Against the bottom of the plate 53, as viewed in Figure 5, a chock member indicated as a whole by the numeral 55 is arranged. This chock is formed of flat metal and is bent into substantially triangular cross sectional shape with the two ends of the metal lying in a common plane to form a wall 56 which is secured to the plate 53. When the chock member 55 is in the normal position shown in Figure 5, a second wall 57 thereof slopes downwardly away from the adjacent end of the movable section 13. The third wall 58 of the chocking member slopes upwardly to the edge of the plate 53 which is adjacent the edge 38 of the ramp 35. When the operating members 51 assume the operating position shown in Figures 9 and 11, the wall 58 of each of the chock members engages one of the rear wheels 50 forwardly thereof to prevent further forward movement of the vehicle.

Each of the operating members 51 is provided with an integral sleeve portion 59 carrying an outstanding stub shaft 60 and the ends of these stub shafts are journaled in bearings 61 carried by the side rail members 34. Thus each of the chock members 55 is pivotally supported by the stationary frame members 34. Each operating member 51 is provided with an arm 62 extending in the opposite direction from the associated arm 52 and provided with a triangular slot 63 having three rounded corner portions 64, 65 and 66. The corner portions 64 and 66 are normally arranged at the top of each arm 62 when the latter is in horizontal position, and when the chocking member 55 is in operative position, the portions of the slots 63 occupy the positions shown in Figure 11.

A shaft 67 extends across angle iron frame members 37 and outwardly beyond such frame members as shown in Figures 6 and 11. The projecting ends of this shaft engage in the slots 63. It will be apparent that when the inner end of each ramp 35 is depressed by the rear wheels of a vehicle under conditions to be described the shaft 67 of each ramp unit will be moved downwardly and will tilt the associated chock member 55 to the operative position shown in Figures 9 and 11.

Between the plate 53 (Figure 5) and the inner end of each ramp unit a plate 68 extends across and is secured to the associated pair of angle irons 37. The ends of the plate of each ramp unit terminate at the outer extremities of the associated pair of angle irons 37 (Figures 6 and 11) thus leaving the operating members 55 free to swing adjacent the angle irons 37. Each plate 68, as shown in Figure 5, terminates a slight distance short of the associated cross piece 39 to provide a slot 70 adapted to receive the lip 31 of the adjacent chock member 27.

Means are provided to prevent the inner end of each pivoted ramp structure from tilting downwardly to the position shown in Figure 9 until after the front wheels of a vehicle have assumed the position indicated in the dotted lines 49 in Figure 9. The cross member 39 (Figure 5) is provided with a pair of ears 71 (Figures 5 and 6) carrying a pivot pin 72 on which is supported a locking dog 73. This dog is adapted to ride over the sloping surface 23 and across the horizontal surface 22 and is urged to turn in a counterclockwise direction as viewed in Figure 5 by a spring 74. Turning movement of the dog 73 in the opposite direction is limited by a lug 75 carried by the dog 73 and engageable with the cross member 39. The spring 74 may be of any desired type and is illustrated as being of the leaf type and as extending over the shaft 67 and then downwardly beneath the lower edge of an angle iron 76 carried by the plate 68.

The operation of the apparatus is as follows:

It will be obvious that the lift without the present attachment may be used in the conventional manner as a free-wheel lift when the use of a lift of such type is desired. When a lift of the run-on type is desired, the present apparatus permits the lift to be quickly and easily converted into the run-on type. The operator will roll the movable structure 14 into position inwardly of one end of the lift and the guide rollers 18 (Figure 4) facilitate the placing of the movable platform structure in position by rolling along one or both of the rails 10. As stated, the rollers 18 may have their brackets 17 fixed against movement inasmuch as there is no great variation in the width of the rails of free-wheel lifts and it merely is necessary to space the rollers 18 a sufficient distance apart to accommodate the widest lift.

With the movable structure 14 approximately in the position shown in Figure 1, the operator will now place the normally stationary structure 13 in position. This structure may be handled much after the fashion of a wheelbarrow, since the operator may grip one of the handles 42 in each hand and roll his structure 13 on the rollers 45 as shown in Figure 2. As the structure 13 approaches the structure 14, the sloping surfaces 46 (Figures 1 and 4) will engage the brackets 17 of the rollers 18 to center the structure 13 with respect to the structure 14 if these two structures are not properly centered. As the structure 13 is moved toward the structure 14 it will be apparent that the locking pins 47 (Figures 2 and 8) will be moving above the plane of the tops of the rails 10. When the structure 13 reaches its proper position with the pins 47 in alignment with the openings 48 in the rails 10, the operator will move the handle end of the structure 13 downwardly, whereupon the pins 47 will engage in the openings 48, thus positively preventing movement of the structure 13 longitudinally of the rails 10. When such position is reached as shown in Figure 3, the rollers 45 will be slightly above the surrounding surface 22.

As the structure 13 is being rolled toward its intended position, the locking dog 73 of each ramp unit will occupy approximately the position shown in Figure 2. As the unit 13 approaches the unit 14, the lower end of each dog 73 will engage the adjacent sloping surface 23 to be moved thereby toward a vertical position and the locking position of the dogs will be reached when the lower ends of these dogs travel from the ends of the slopes 23 to the horizontal surfaces 22. Since the dog of each ramp unit has its pivot 72 fixed with respect to the adjacent ends of the ramp units, such ends of the ramp units will be fixed against downward movement, the weight of the parts and the weight of a vehicle travelling over the ramp units being supported on the surface 22 of each body 19 and by the wheels 20 thereof. The lip 31 of each chock device 27 will be engageable in the slot 70 of the adjacent ramp unit as shown in Figure 5 when the parts are in normal position prior to driving a vehicle on the lift. Such position of the parts positively prevents the movable structure 14 from moving away from the structure 13.

Under the conditions referred to all of the parts will occupy the positions shown in Figures 1, 3 and 5, and the apparatus will be ready for a vehicle to be driven thereon. The operations referred to, wherein the present device is attached to a free-wheel lift and prepared to receive a vehicle, obviously may be carried out very easily and in a short space of time. The vehicle is driven onto the lift from the left hand end thereof as viewed in Figures 1, 3, 5 and 9, the front wheels initially riding over the sloping ramp ends 40, the lower ends of which are approximately in contact with the surrounding surface 22. If the vehicle is not accurately driven on the lower end of the sloping ramp portion 40, the handles 42 will act to guide the wheels into proper position on the ramps.

The front wheels of the vehicle move upwardly along the inclined ramp portions 49, then over the portions 35 of the ramps. The latter portions of the ramps are prevented from swinging downwardly under the weight of the vehicle by the locking dog 73 associated with each ramp unit. The front wheels accordingly pass over the plates 53 and thence across the plates 68 and across the chock members 27, which normally occupy the positions shown in Figures 3 and 5. As the vehicle wheels pass beyond the pivots 28 (Figures 5 and 9) of the chock members 27, these members will be tilted to the operative position shown in Figure 9 and it will be apparent that each front wheel will come to rest against one of the stationary chocks 24 and the associated movable chock 27, as shown in dotted lines and indicated by the numeral 49 in Figure 9.

It will be apparent that as the front wheels of the vehicle tilt the two chock members 27 at the sides of the apparatus, the lip 31 of each movable chock will be released from its slot 70 (Figure 5) and accordingly the platform unit 14 will be free to move. The driver of the vehicle continues to drive the vehicle forwardly under its own power and since the front wheels of the vehicle will be fixed against movement with respect to the platform structure 14 by the chocks 24 and 27, the structure 14 will be moved forwardly away from the structure 13. As this operation takes place, the locking dogs 73 will move relatively over the horizontal surfaces 22 and then down the inclined surfaces 23, and as the latter operation takes place the spring 74 of each locking dog will move it to the inoperative position shown in Figure 9. Accordingly it will be apparent that the downwardly swinging ends of the ramps will no longer be supported by the movable structure 14, and as the rear wheels of the vehicle move over the inclined ramp portions 40 and then past the pivots 43 (Figure 3) the free ends of the ramps will move downwardly to the position shown in Figure 9.

As the rear wheels of the vehicle depress the free ends of the ramps, the shaft 67 of each ramp will move downwardly from a position adjacent the rounded corner 64 of each slot 63, to the corner portion 65, and will then engage the lower limit of the slot as viewed in Figure 5 to swing the arms 62 downwardly and thus turn the chock members 55 upwardly to the position shown in Figures 9 and 11. When each shaft 67 reaches the lower corners 66 of its associated slots 63, further downward movement of the shafts 67 will be prevented, and accordingly the bottoms of the slots 63 as viewed in Figure 11 will support the free ends of the ramps against further downward movement. The vehicle will continue to move forwardly until the rear wheels 50 reach the dotted line position shown in Figure 9, whereupon further forward movement of the vehicle will be prevented. The vehicle then may be lifted for the performance of any desired work thereon.

After the desired work has been performed on the car the lift is lowered, and the vehicle then may be backed off from the apparatus under its own power. As the vehicle starts rearwardly, the front wheels of the vehicle will move the platform structure 14 rearwardly and as the rear wheels pass the pivot 43 (Figure 3) the weight of the rear end of the vehicle on the sloping ramp 40 will move each ramp unit back to its normal position as in Figures 3 and 4. It will be apparent that as the movable structure 14 approaches the stationary structure 13, one of the sloping surfaces 23 (Figure 5) will move beneath each dog 73 and these dogs will turn in a counter-clockwise direction from the position shown in Figure 9 to the position shown in Figure 5, the latter position being reached when the dogs 73 reach positions over the horizontal surfaces 22. Rearward movement of the structure 14 will be stopped when the transverse frame member 33 (Figures 3 and 5) of each ramp unit reaches the forward end of the associated horizontal surface 22.

When the parts assume the positions described, the locking dogs 73 will support the free ends of the movable ramp sections against downward movement, and as the locking dogs approach the position referred to they will have elevated the angle irons 37 and shafts 67 to swing the arms 62 and restore the chock member 51 to the normal position shown in Figure 5. Accordingly all of the parts of the fixed platform section 13 will be restored to normal position. As the vehicle continues to move rearwardly after movement of the platform section 14 has been arrested, the front wheels of the vehicle will roll rearwardly over the chock members 27 and will tilt these members back to their normal position (Figure 5) with the lip 31 of each chock element 27 in locking position. Rearward movement of the vehicle will be continued until the vehicle is completely withdrawn from the structure and all of the parts of the apparatus will have been restored to normal position ready for the next operation.

The apparatus readily may be removed from the lift by reversing the operations through which it is placed in position. The operator will grasp and lift the handles 42, which will move the pins 47 (Figures 1 and 8) from the openings 47 in the rails 10, and the rollers 45 will engage the ground to permit the structure 13 to be rolled out of position. The structure 14 then may be rolled longitudinally of the rails 10 to be entirely removed therefrom. The closed sloping ends 21 and 23 of the bodies 19 not only protect the rollers 20 while the structure 13 is being placed in position and removed, but also serve to push out of the way any tools or other articles which may be in their path, thus preventing the wheels 20 from running over such articles.

From the foregoing it will be apparent that the present apparatus provides means whereby a free-wheel lift may be quickly and easily converted into a run-on lift, thus requiring that the user purchase only a single complete lift which may be used either as a free-wheel or run-on lift as may be desired. When the apparatus is assembled, the operation of the mechanism is wholly automatic, it merely being necessary to drive the vehicle onto the apparatus, whereupon the structure 14 will be automatically unlocked and moved away from the structure 13 to permit the rear vehicle wheels to assume the proper positions on such structure. The operation of the parts also is automatic when the vehicle is driven from the mechanism, the structure 14 being moved toward the structure 13, the ramp units being restored to normal position, and the structures 13 and 14 being automatically locked together.

The structures 13 and 14 are so constructed and arranged as to be readily portable and the handles 42 serve the double function of facilitating the wheeling of the structure 13 into position and guiding the front wheels of the vehicle as they roll up the lower ends of the inclined ramp sections 40. The rollers 45 not only facilitate movement of the section 13, but the brackets 44 which secure such rollers also serve to center the section 13 with respect to the section 14 by engaging the roller brackets 17 as the section 13 approaches its normal position with respect to the section 14.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, and means cooperating between said structures to support said ramps against downward movement when said structures are in predetermined adjacent relationship.

2. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, and locking means carried by said first named structure and engageable with portions of said other structure to lock said ramps against downward movement when such structures are in predetermined adjacent relationship.

3. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, interengaging means normally preventing movement of said other structure away from said first named structure, and means cooperating between said structures to support said ramps against downward movement when said structures are in predetermined adjacent relationship.

4. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from the said first named structure, a pair of chocking devices carried by said other structure and movable to operative positions for chocking a pair of vehicle wheels, said chocking devices normally cooperating with a portion of said first named structure to prevent movement of said second named structure therefrom, and means cooperating between said structures to support said ramps against downward movement when said structures are in predetermined adjacent relationship.

5. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, interengaging means normally preventing movement of said other structure away from said first named structure, and locking means carried by said first named structure and engageable with portions of said other structure to lock said ramps against downward movement when such structures are in predetermined adjacent relationship.

6. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, a pair of chocking devices carried by said other structure and movable to operative positions for chocking a pair of vehicle wheels, said chocking devices normally cooperating with a portion of said first named structure to prevent movement of said second named structure therefrom, and locking means carried by said first named structure and engageable with portions of said other structure to lock said ramps against downward movement when such structures are in predetermined adjacent relationship.

7. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, means cooperating between said structures to support said ramps against downward movement when said structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

8. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, locking means carried by said first named structure and engageable with portions of said other structure to lock said ramps against downward movement when such structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

9. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, interengaging means normally preventing movement of said other structure away from said first named structure, means cooperating between said structures to support said ramps against downward movement when said structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

10. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, a pair of chocking devices carried by said other structure and movable to operative positions for chocking a pair of vehicle wheels, said chocking devices normally cooperating with a portion of said first named structure to prevent movement of said second named structure therefrom, means cooperating between said structures to support said ramps against downward movement when said structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

11. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, interengaging means normally preventing movement of said other structure away from said first named structure, locking means carried by said first named structure and engageable with portions of said other structure to lock said ramps against downward movement when such structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

12. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, a pair of chocking devices carried by said other structure and movable to operative positions for chocking a pair of vehicle wheels, said chocking devices normally cooperating with a portion of said first named structure to prevent movement of said second named structure therefrom, locking means carried by said first named structure and engageable with portions of said other structure to lock said ramps against downward movement when such structures are in predetermined adjacent relationship, wheels carried by said first named structure normally out of engagement with the surrounding surface, said wheels being engageable with the surrounding surface when said first named structure is tilted whereby such structure may be rolled into position with respect to said rails, and cooperating means engageable when said first named structure is tilted whereby said first named structure will be fixed against movement with respect to said rails when in normal position.

13. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, means for locking said ramps against downward movement when said structures are in predetermined adjacent relationship and to release said ramps for downward movement when said other structure moves away from said first named structure, and chocking devices carried by said first named structure and movable to operative positions to chock a pair of vehicle wheels upon downward movement of said ramps by the weight of the vehicle wheels thereon.

14. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, a pair of chocking devices carried by said other structure and normally arranged in positions whereby the wheels of a vehicle may roll from said first named structure to said other structure, means constructed and arranged to lock said ramps against downward movement when said structures are in such predetermined adjacent relationship and to release said ramps for downward movement when said other structure moves away from said first named structure, and chocking devices carried by said first named structure and movable to operative positions to chock a pair of vehicle wheels upon downward movement of said ramps by the weight of the vehicle wheels thereon.

15. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure to the other structure, said other structure being mounted for movement away from said first named structure, a pair of chocking devices carried by said other structure and normally arranged in positions whereby the wheels of a vehicle may roll thereover from said first named structure to said other structure and having portions normally engaging said first named structure to prevent movement of said other structure therefrom, said chocking devices being movable by the passage of vehicle wheels thereover to operative positions for chocking such wheels and for releasing said structures from each other, means for locking said ramps against downward movement when said structures are in such predetermined adjacent relationship and for releasing said ramps for downward movement when said other structure moves away from said first named structure, and means cooperating with said ramps when the latter are moved downwardly by a second pair of vehicle wheels thereon for chocking such wheels on said first named structure.

16. In combination with a free wheel vehicle lift having supporting rails normally engageable with the axles of a vehicle, a pair of supporting structures mounted on said rails and each engageable with a pair of vehicle wheels whereby upward movement of said rails will be imparted directly to the wheels of the vehicle, one of said structures having a pair of downwardly movable ramps over which a pair of vehicle wheels pass to move from one structure toward the other structure, said other structure being mounted for movement away from said first named structure, a pair of chocking devices carried by said other structure and normally arranged in positions whereby the wheels of a vehicle may roll thereover from said first named structure to said other structure when said structures are in predetermined adjacent relationship and having portions normally engaging said first named structure to prevent movement of said other structure therefrom, said chocking devices being movable by the passage of vehicle wheels thereover to operative positions for chocking such wheels and for releasing said structures from each other, means for locking said ramps against downward movement when said structures are in said predetermined adjacent relationship and for releasing said ramps for downward movement when said other structure moves away from said first named structure, chocking devices carried by said first named structure, and means connecting said last named chocking devices to said ramps to be moved to operative position to chock a second pair of wheels on said ramps when the latter are moved downwardly by such wheels.

17. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, and means carried by said first named structure and engageable with said upwardly facing portions to prevent downward movement of said ramps when said structures are in predetermined adjacent relationship.

18. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, and pivoted locking members having depending ends engageable with said upwardly facing portions to support said ramp against downward movement when said structures are in predetermined adjacent relationship, said other structure having sloping surfaces leading to said upwardly facing portions and over which said depending ends of said locking members move toward said upwardly facing portions when said other structure is moved toward said adjacent relationship.

19. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, pivoted chocking elements carried by said other structure, said chocking elements normally occupying substantially horizontal positions for the passage of a pair of vehicle wheels from said first named structure to said other structure and movable by such wheels as they pass to said other structure to assume chocking positions, said chocking elements having portions normally engaging said first named structure to prevent movement of said other structure therefrom, and means carried by said first named structure and engageable with said upwardly facing portions to prevent downward movement of said ramps when said structures are in predetermined adjacent relationship.

20. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, pivoted chocking elements carried by said other structure, said chocking elements normally occupying substantially horizontal positions for the passage of a pair of vehicle wheels from said first named structure to said other structure and movable by such wheels as they pass to said other structure to assume chocking positions, said chocking elements having portions normally engaging said first named structure to prevent movement of said other structure therefrom, and pivoted locking members having depending ends engageable with said upwardly facing portions to support said ramp against downward movement when said structures are in predetermined adjacent relationship, said other structure having sloping surfaces leading to said upwardly facing portions and over which said depending ends of said locking members move toward said upwardly facing portions when said other structure is moved toward said adjacent relationship.

21. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, means carried by said first named structure and engageable with said upwardly facing portions to prevent downward movement of said ramps when said structures are in predetermined adjacent relationship, chocking elements carried by said first named structure between said ramps and said second named structure and normally horizontally arranged for the passage of vehicle wheels thereover, and slotted arms carried by said chocking elements and engageable by portions of said ramps whereby downward movement of said ramps moves said chocking elements to operative positions engaging vehicle wheels on said ramps.

22. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, pivoted locking members having depending ends engageable with said upwardly facing portions to support said ramp against downward movement when said structures are in predetermined adjacent relationship, said other structure having sloping surfaces leading to said upwardly facing portions and over which said depending ends of said locking members move toward said upwardly facing portions when said other structure is moved toward said adjacent relationship, chocking elements carried by said first named structure between said ramps and said second named structure and normally horizontally arranged for the passage of vehicle wheels thereover, and slotted arms carried by said chocking elements and engageable by portions of said ramps whereby downward movement of said ramps moves said chocking elements to operative positions engaging vehicle wheels on said ramps.

23. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, pivoted chocking elements carried by said other structure, said chocking elements normally occupying substantially horizontal positions for the passage of a pair of vehicle wheels from said first named structure to said other structure and movable by such wheels as they pass to said other structure to assume chocking positions, said chocking elements having portions normally engaging said first named structure to prevent movement of said other structure therefrom, means carried by said first named structure and engageable with said upwardly facing portions to prevent downward movement of said ramps when said structures are in predetermined adjacent relationship, chocking elements carried by said first named structure between said ramps and said second named structure and normally horizontally arranged for the passage of vehicle wheels thereover, and slotted arms carried by said last named chocking elements and engageable by portions of said ramps whereby downward movement of said ramps moves said last named chocking elements to operative positions engaging vehicle wheels on said ramps.

24. In combination with a free wheel vehicle lift having supporting rails normally engageable with the axles of a vehicle, a pair of supporting structures mounted on said rails and each engageable with a pair of vehicle wheels whereby upward movement of said rails will be directly imparted to the wheels of the vehicle, one of said structures having a pair of downwardly movable ramps over which a pair of vehicle wheels pass to move from one structure to the other structure, said other structure being movable away from said first named structure and having upwardly facing portions adjacent the first named structure, pivoted chocking elements carried by said other structure, said chocking elements normally occupying substantially horizontal positions for the passage of a pair of vehicle wheels from said first named structure to said other structure and movable by such wheels as they pass to said other structure to assume chocking positions, said chocking elements having portions normally engaging said first named structure to prevent movement of said other structure therefrom, pivoted locking members having depending ends engageable with said upwardly facing portions to support said ramp against downward movement when said structures are in predetermined adjacent relationship, said other structure having sloping surfaces leading to said upwardly facing portions and over which said depending ends of said locking members move toward said upwardly facing portions when said other structure is moved toward said adjacent relationship, chocking elements carried by said first named structure between said ramps and said second named structure and normally horizontally arranged for the passage of vehicle wheels thereover, and slotted arms carried by said last named chocking elements and engageable by portions of said ramps whereby downward movement of said ramps moves said last named chocking elements to operative positions engaging vehicle wheels on said ramps.

PHILIP J. KROLL.